United States Patent
Higuchi et al.

(10) Patent No.: US 11,738,603 B2
(45) Date of Patent: Aug. 29, 2023

(54) TIRE

(71) Applicant: Sumitomo Rubber Industries, Ltd., Kobe (JP)

(72) Inventors: Keiji Higuchi, Kobe (JP); Teppei Nakamichi, Kobe (JP); Tomohisa Kuriyama, Kobe (JP); Kengo Fukuda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 232 days.

(21) Appl. No.: 17/116,392

(22) Filed: Dec. 9, 2020

(65) Prior Publication Data

US 2021/0170800 A1 Jun. 10, 2021

(30) Foreign Application Priority Data

Dec. 10, 2019 (JP) ................................. 2019-223073
Oct. 28, 2020 (JP) ................................. 2020-180791

(51) Int. Cl.
*B60C 11/12* (2006.01)
*B60C 11/03* (2006.01)

(52) U.S. Cl.
CPC ...... *B60C 11/1236* (2013.01); *B60C 11/0304* (2013.01); *B60C 11/1281* (2013.01); *B60C 2011/036* (2013.01); *B60C 2011/0353* (2013.01)

(58) Field of Classification Search
CPC ............. B60C 11/0304; B60C 11/1236; B60C 11/1281

See application file for complete search history.

(56) References Cited

U.S. PATENT DOCUMENTS 10,562,353 B2   2/2020  Clayton et al.
2005/0121123 A1*  6/2005  Nakagawa .......... B60C 11/0304
                                           152/209.9

FOREIGN PATENT DOCUMENTS

| EP | 3 153 334 A1 | 4/2017 | |
| EP | 3 575 111 A1 | 12/2019 | |
| EP | 3 611 039 A1 | 2/2020 | |
| JP | 2014237398 A | * 12/2014 | ........... B60C 11/125 |
| JP | 2016-199118 A | 12/2016 | |
| JP | 2018052151 A | * 4/2018 | ........ B60C 11/0304 |
| KR | 100517317 B1 | * 9/2005 | |

OTHER PUBLICATIONS

English machine translation of JP-2014237398-A (Year: 2014).*
Extended European Search Report dated May 7, 2021 in European Patent Application No. 20212491.3, 8 pages.

* cited by examiner

*Primary Examiner* — Robert C Dye
(74) *Attorney, Agent, or Firm* — XSENSUS LLP

(57) ABSTRACT

Provided is a tire including a tread portion. The tread portion can include three circumferential grooves and four land portions. The circumferential grooves can include two shoulder circumferential grooves and one crown circumferential groove. The land portions can include two shoulder land portions and two middle land portions. The two middle land portions can each include a circumferential sipe, a plurality of first middle lateral grooves, and a plurality of second middle lateral grooves. The two shoulder land portions can each include a plurality of shoulder lateral grooves extending from a tread end and terminating in the shoulder land portion.

12 Claims, 8 Drawing Sheets

TIRE

CROSS REFERENCE TO RELATED APPLICATION(S)

The present application claims priority to Japanese patent application JP 2019-223073, filed on Dec. 10, 2019 and Japanese patent application JP 2020-180791, filed on Oct. 28, 2020, the entire contents of each of which is incorporated herein by reference in its entirety.

BACKGROUND

Technical Field

The present disclosure relates to a tire.

Description of the Background Art

Japanese Laid-Open Patent Publication No. 2015-139194 suggests a tire (hereinafter, may be referred to as "4-rib tire") having a tread portion sectioned into four land portions. In the tire disclosed in Japanese Laid-Open Patent Publication No. 2015-139194, the arrangement of grooves is described as being for steering stability.

In recent years, enhanced performance of vehicles requires a tire to exhibit more excellent steering stability. Meanwhile, enhancement of steering stability may cause degradation of ride comfort depending on arrangement of grooves.

The present disclosure has been made in view of the aforementioned and other problems, and an aspect of the present disclosure is to provide a 4-rib tire exhibiting excellent steering stability while maintaining ride comfort.

SUMMARY

The present disclosure is directed to a tire including a tread portion. The tread portion can include three circumferential grooves extending between two tread ends continuously in a tire circumferential direction, and four land portions demarcated by the circumferential grooves. The circumferential grooves can include two shoulder circumferential grooves and one crown circumferential groove disposed between the two shoulder circumferential grooves. The land portions can include two shoulder land portions including the tread ends, and two middle land portions demarcated between the shoulder circumferential grooves and the crown circumferential groove. Each of the two middle land portions can include: a circumferential sipe extending continuously in the tire circumferential direction; a plurality of first middle lateral grooves extending from the crown circumferential groove and terminating in a corresponding one of the middle land portions without connecting with the circumferential sipe; and a plurality of second middle lateral grooves extending from a corresponding one of the shoulder circumferential grooves and terminating in the corresponding one of the middle land portions without connecting with the circumferential sipe. Each of the two shoulder land portions can include a plurality of shoulder lateral grooves extending from a corresponding one of the tread ends and terminating in a corresponding one of the shoulder land portions.

DESCRIPTION OF THE PREFERRED EMBODIMENTS

Embodiments of the present disclosure will be described below with reference to the drawings.

Figure 1:
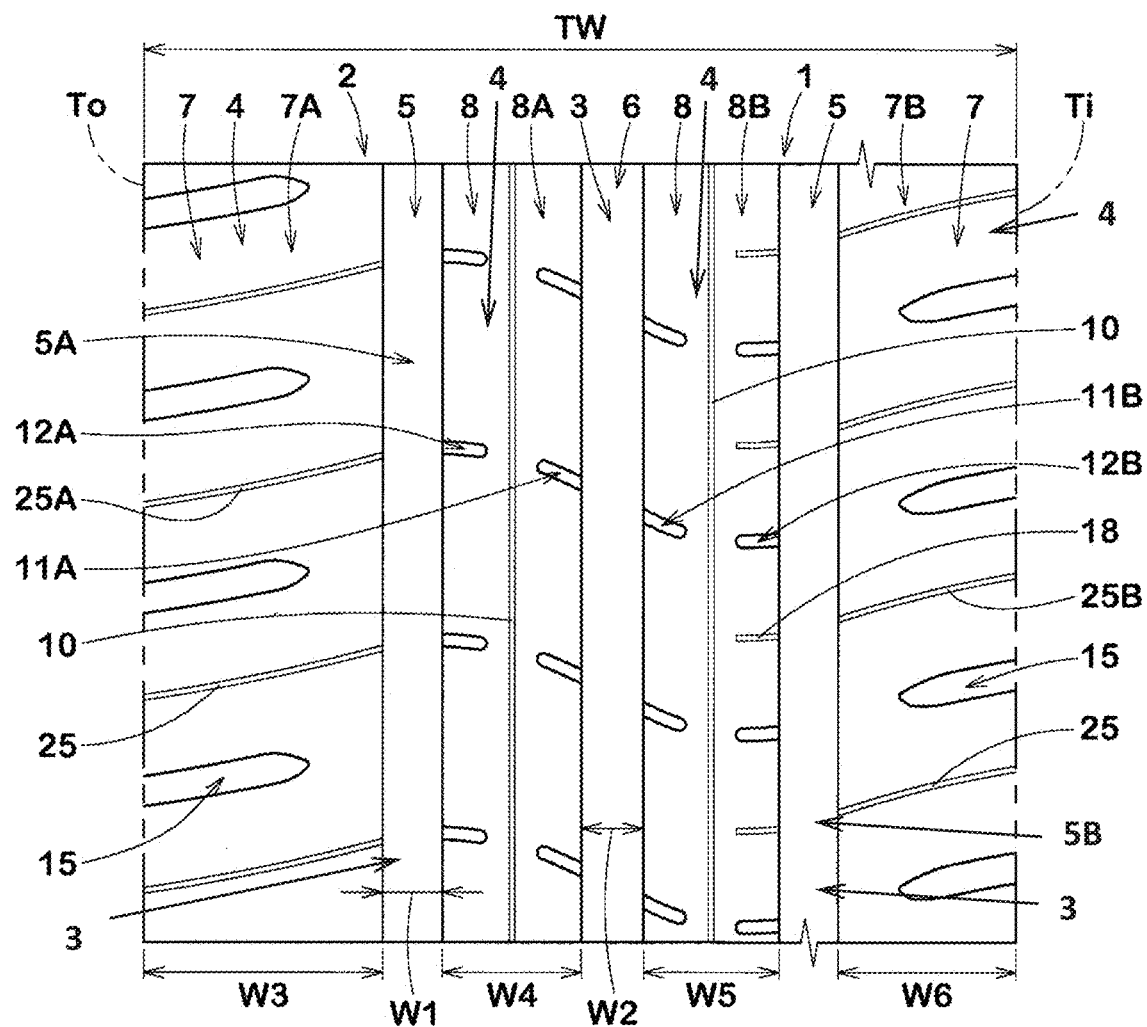
FIG. 1 is a development of a tread portion of a tire according to one embodiment of the present disclosure.

FIG. 1 is a development of a tread portion 2 of a tire 1 according to an embodiment of the present disclosure. The tire 1 of the present embodiment is, for example, a pneumatic tire for a passenger car. However, the tire 1 of the present disclosure is not limited to such a tire. As shown in FIG. 1, the tire 1 of the present embodiment has the tread portion 2 having, for example, a designated mounting direction to a vehicle. The mounting direction to the vehicle is indicated on, for example, the sidewall portion or the like by characters or a mark.

The tread portion 2 has three circumferential grooves 3 extending between two tread ends To and Ti continuously in the tire circumferential direction (vertically with reference to FIG. 1), and four land portions 4 demarcated by the circumferential grooves 3.

The two tread ends To and Ti include the outer tread end To located on the outer side of the vehicle when the tire 1 is mounted to the vehicle and the inner tread end Ti located on the inner side of the vehicle when the tire 1 is mounted to the vehicle.

The outer tread end To and the inner tread end Ti are outermost ground contact positions in the tire axial direction (horizontally with reference to FIG. 1) in a case where, when the tire 1 as a pneumatic tire is in a normal state where the tire 1 is mounted on a normal rim, is inflated with normal internal pressure, and is under no load, a normal load is applied to the tire 1 and the tire 1 is brought in contact with a plane at a camber angle of 0°. Unless otherwise specified, dimensions and the like of components of the tire 1 are indicated as values measured in the normal state.

The term "normal rim" represents a rim that is defined by a standard, in a standard system including the standard with which the tire complies, for each tire, and is, for example, the "standard rim" in the JATMA standard, the "Design Rim" in the TRA standard, or the "Measuring Rim" in the ETRTO standard.

The term "normal internal pressure" represents an air pressure that is defined by a standard, in a standard system including the standard with which the tire complies, for each tire, and is the "maximum air pressure" in the JATMA standard, the maximum value recited in the table "TIRE LOAD LIMITS AT VARIOUS COLD INFLATION PRESSURES" in the TRA standard, or the "INFLATION PRESSURE" in the ETRTO standard.

The term "normal load" represents a load that is defined by a standard, in a standard system including the standard with which the tire complies, for each tire, and is the "maximum load capacity" in the JATMA standard, the maximum value recited in the table "TIRE LOAD LIMITS AT VARIOUS COLD INFLATION PRESSURES" in the TRA standard, or the "LOAD CAPACITY" in the ETRTO standard.

According to one or more embodiments, the circumferential groove 3 extends linearly parallel to the tire circumferential direction with a constant groove width. However, the circumferential groove 3 may extend in a wavy manner or extend so as to regularly change the groove width.

The circumferential grooves 3 include two shoulder circumferential grooves 5 and one crown circumferential groove 6. One of the shoulder circumferential grooves 5 is disposed on one side lateral to the tire equator and the other of the shoulder circumferential grooves 5 is disposed on the other side lateral thereto. The crown circumferential groove 6 is disposed between the two shoulder circumferential grooves 5. In the present embodiment, a circumferential edge of the crown circumferential groove 6 on the outer tread end To side is disposed on the tire equator.

The two shoulder circumferential grooves 5 include an outer shoulder circumferential groove 5A and an inner shoulder circumferential groove 5B. The outer shoulder circumferential groove 5A is disposed between the outer tread end To and the tire equator. The inner shoulder circumferential groove 5B is disposed between the inner tread end Ti and the tire equator.

For example, a distance in the tire axial direction from the tire equator to the groove center line of the shoulder circumferential groove 5 is preferably 15% to 25% of a tread width TW. For example, a distance in the tire axial direction from the tire equator to the groove center line of the crown circumferential groove 6 is preferably not greater than 5% of the tread width TW. The tread width TW is a distance in the tire axial direction from the outer tread end To the inner tread end Ti in the normal state.

Each circumferential groove 3 has a groove width that is greater than at least 1.5 mm, preferably not less than 3.0 mm, and more preferably not less than 4.0 mm. For example, each circumferential groove 3 preferably has a groove width that is 5.0% to 8.0% of the tread width TW. For example, the groove depth of each circumferential groove 3 is preferably 5 to 12 mm.

In the present embodiment, a groove width W of the shoulder circumferential groove 5 is less than a groove width W2 of the crown circumferential groove 6. Specifically, the groove width W1 of the shoulder circumferential groove 5 is 91% to 99% of the groove width W2 of the crown circumferential groove 6, and is preferably 94% to 98% thereof.

In one or more embodiments, the total of the groove widths W1, W2 of the circumferential grooves 3 is 15% to 27% of the tread width TW. Thus, steering stability and ride comfort can be enhanced in a well-balanced manner.

The land portions 4 include two shoulder land portions 7 that may include the outer tread end To and the inner tread end Ti, respectively, and two middle land portions 8 demarcated between the shoulder circumferential grooves 5 and the crown circumferential groove 6. In the present embodiment, the two shoulder land portions 7 include an outer shoulder land portion 7A that may include the outer tread end To and an inner shoulder land portion 7B that may include the inner tread end Ti. The two middle land portions 8 include an outer middle land portion 8A and an inner middle land portion 8B. The outer middle land portion 8A can be on a side associated with (e.g., adjacent to) the outer shoulder land portion 7A and is demarcated between the outer shoulder circumferential groove 5A and the crown circumferential groove 6. The inner middle land portion 8B can be on a side associated with (e.g., adjacent to) the inner shoulder land portion 7B and is demarcated between the inner shoulder circumferential groove 5B and the crown circumferential groove 6.

Figure 2:
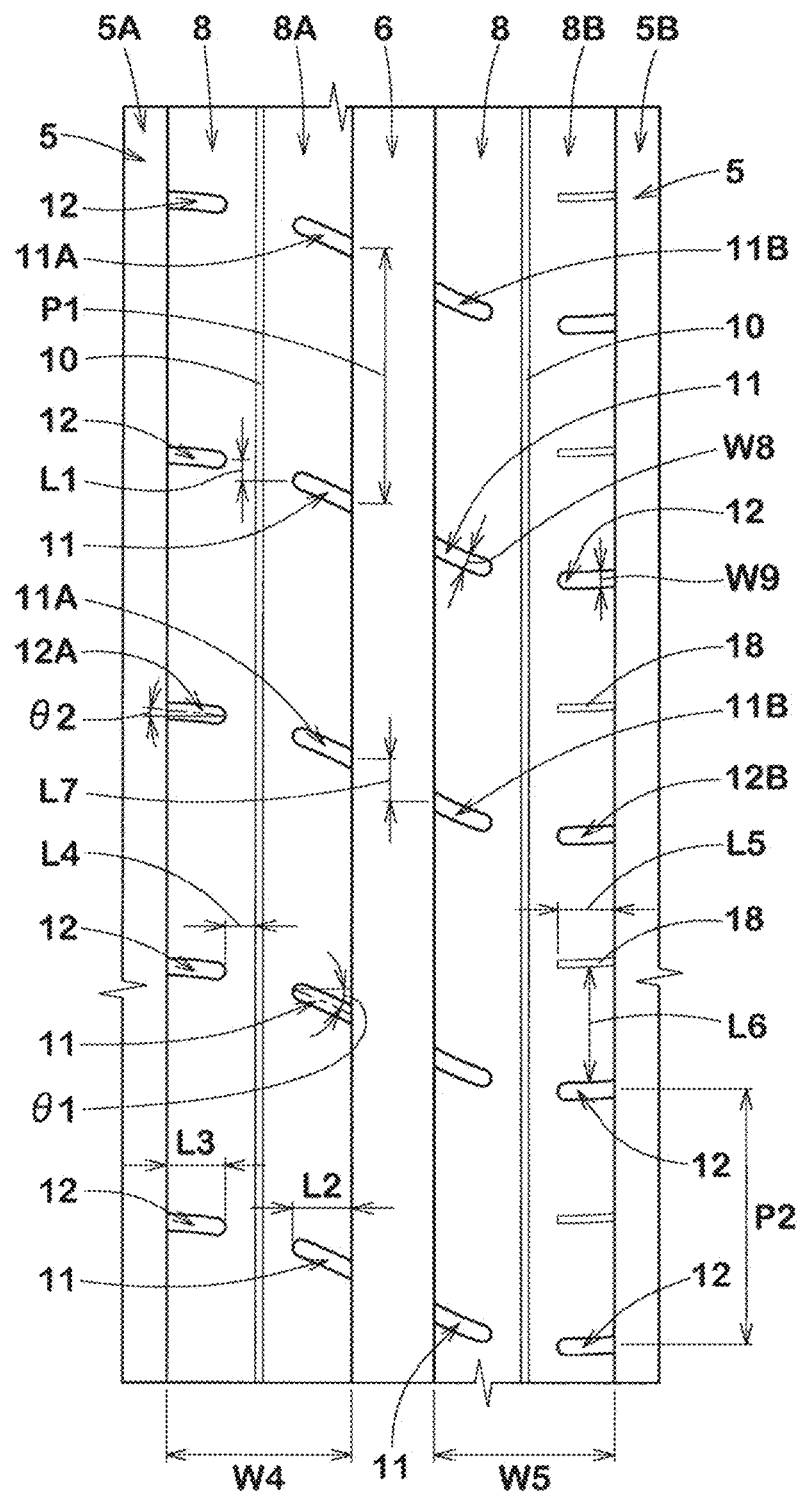
FIG. 2 is an enlarged view of a portion of FIG. 1.

FIG. 2 is an enlarged view of FIG. 1 showing the outer middle land portion 8A and the inner middle land portion 8B. As shown in FIG. 2, the outer middle land portion 8A and the inner middle land portion 8B each include a circumferential sipe 10 extending continuously in the tire circumferential direction, a plurality of first middle lateral grooves 11 extending from the crown circumferential groove 6 and terminating in the middle land portion 8 without connecting with the circumferential sipe 10, and a plurality of second middle lateral grooves 12 extending from the shoulder circumferential groove 5 and terminating in the middle land portion 8 without connecting with the circumferential sipe 10. In the description herein. "sipe" refers to a cut having a width of not greater than 1.5 mm.

The circumferential sipe 10 can allow appropriate reduction of stiffness in the tire axial direction and enhancement of ride comfort while maintaining stiffness of the middle land portion 8 in the tire circumferential direction. The first middle lateral grooves 11 and the second middle lateral grooves 12 terminate in the middle land portion 8 without connecting with the circumferential sipe 10, and thus can allow ride comfort to be enhanced while maintaining stiffness of the middle land portion 8 in the tire circumferential direction.

The two middle land portions 8 in which stiffness in the tire circumferential direction is maintained can also contribute to enhancement of steering stability. Furthermore, the tire 1 having the two middle land portions 8 can be expected to exert relatively high cornering force also in a case where ground contact pressure is low and a slip angle is small. Therefore, for example, in a case where the tires 1 of the present disclosure are mounted to all wheels of a front-wheel-drive vehicle, cornering force can be sufficiently exerted by rear wheel tires, convergence of yawing of the vehicle can be facilitated at the start of cornering, and excellent steering stability can be exhibited.

In the present embodiment, in each of the outer middle land portion 8A and the inner middle land portion 8B, an angle of the first middle lateral groove 11 relative to the tire axial direction is different from an angle of the second middle lateral groove 12 relative to the tire axial direction. Thus, frictional force can be exerted in multiple directions by edges of the lateral grooves 11, 12 during running on a wet road surface, to enhance wet performance.

Figure 3:
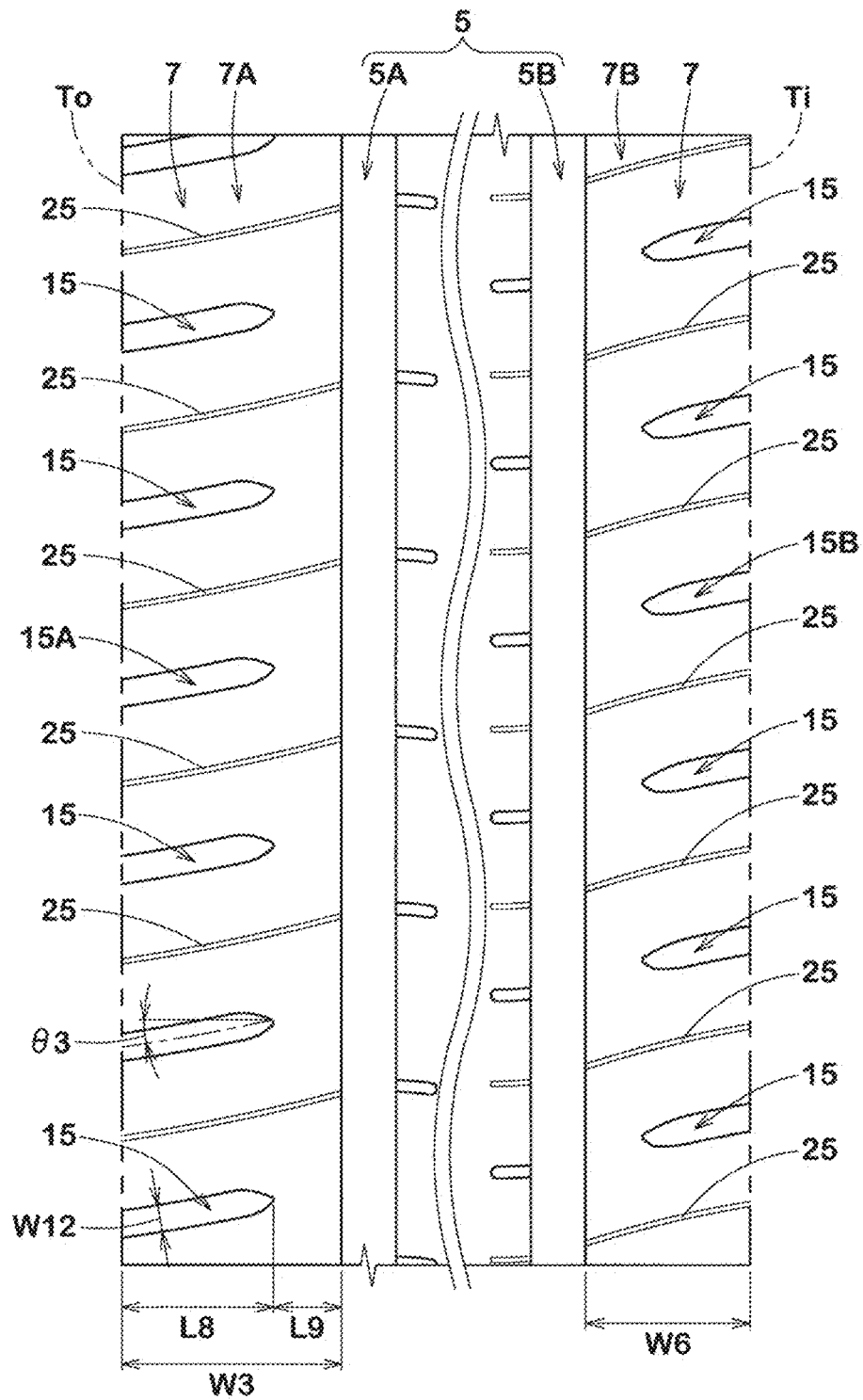
FIG. 3 is an enlarged view of a portion of FIG. 1.

FIG. 3 is an enlarged view of FIG. 1 showing the outer shoulder land portion 7A and the inner shoulder land portion 7B. As shown in FIG. 3, in the present disclosure, the two shoulder land portions 7 each include a plurality of shoulder lateral grooves 15 extending from the outer tread end To or the inner tread end Ti and terminating in the shoulder land portion 7. Therefore, excellent steering stability can be exhibited while ride comfort is maintained.

A more specific structure of the present embodiment will be described below. In the present embodiment, in a case where the tire 1 is mounted to a front-wheel-drive vehicle, the width of each land portion 7, 8 in the tire axial direction can be specified as follows in order to exhibit more excellent steering stability.

As shown in FIG. 1 and FIG. 3, a width W3 of the outer shoulder land portion 7A in the tire axial direction is greater than a width W6 of the inner shoulder land portion 7B in the tire axial direction. The width W6 of the inner shoulder land portion 7B in the tire axial direction is greater than a width W4 of the outer middle land portion 8A in the tire axial direction. The width W4 of the outer middle land portion 8A in the tire axial direction is greater than a width W5 of the inner middle land portion 8B in the tire axial direction.

In other words, the width of each of the shoulder land portions 7 in the tire axial direction is set to be greater than the width of the middle land portion 8 in the tire axial direction. In comparison between the two shoulder land portions 7 or comparison between the two middle land portions 8, the width of the land portion on the outer tread end To side is set to be greater than the width of the land portion on the inner tread end Ti side.

In a case where the tires 1 having such a structure according to the present embodiment are mounted to all wheels of a front-wheel-drive vehicle, the front wheel tires can exert high cornering force to enhance responsiveness to steering, whereas the rear wheel tires can also sufficiently exert cornering force to facilitate convergence of yawing of the vehicle at the start of the cornering. Therefore, in the present embodiment, in a case where the tires 1 are mounted to all wheels of a front-wheel-drive vehicle, more excellent steering stability can be exhibited.

The width W3 of the outer shoulder land portion 7A is preferably not less than 23% of the tread width TW. The width W3 of the outer shoulder land portion 7A is preferably 140% to 146% of the width W5 of the inner middle land portion 8B. The width W6 of the inner shoulder land portion 7B is preferably 120% to 126% of the width W5 of the inner middle land portion 8B. The width W4 of the outer middle land portion 8A is preferably 101% to 105% of the width W5 of the inner middle land portion 8B. Whichever of front and rear wheels of a vehicle the tire 1 having such a structure according to the present embodiment is used for, high cornering force can be exerted and steering stability can be enhanced.

As shown in FIG. 2, the circumferential sipe 10 in the middle land portion 8 can be disposed at the center portion of the middle land portion 8 in the tire axial direction. The circumferential sipe 10 having such a structure can exhibit the above-described effects, and can allow striking sound to be reduced when the middle land portion 8 comes into contact with the ground, thereby enhancing noise performance. A distance in the tire axial direction from the circumferential edge of the middle land portion 8 on the tire equator side to the circumferential sipe 10 is preferably 20% to 80% of the width of the middle land portion 8 in the tire axial direction, and more preferably 40% to 60% thereof. In the present embodiment, the circumferential sipe 10 can be disposed at the center position of the middle land portion 8 in the tire axial direction.

A width of the circumferential sipe 10 is not greater than 1.5 mm and preferably 0.6 to 1.2 mm. A depth of the circumferential sipe 10 is, for example, 1.5 to 4.0 mm. The circumferential sipe 10 is, for example, disposed over 80% to 100% of the entire circumference of the tire.

The first middle lateral groove 11 is, for example, inclined relative to the tire axial direction. In the present embodiment, the first middle lateral grooves 11A in the outer middle land portion 8A and the first middle lateral grooves 11B in the inner middle land portion 8B are inclined in the same direction (right-downward direction in FIG. 2). An angle $\theta 1$ of the first middle lateral groove 11 relative to the tire axial direction is, for example, 10 to 30°, and preferably 19 to 25°. The first middle lateral grooves 11 having such a structure can contribute to well-balanced enhancement of ride comfort and steering stability.

The second middle lateral groove 12A in the outer middle land portion 8A is, for example, inclined relative to the tire axial direction in the same direction as the first middle lateral groove 11. An angle $\theta 2$ of the second middle lateral groove 12A relative to the tire axial direction is less than the angle $\theta 1$ of the first middle lateral groove 11. The angle $\theta 2$ is, for example, 8 to 20°.

An angle of the second middle lateral groove 12B in the inner middle land portion 8B relative to the tire axial direction is, for example, less than the angle $\theta 2$ of the second middle lateral groove 12A in the outer middle land portion 8A. The angle of the second middle lateral groove 12B in the inner middle land portion 8B relative to the tire axial direction is not greater than 10° and preferably not greater than 5°. For instance, in the present embodiment, the second middle lateral groove 12 can extend parallel to the tire axial direction.

One pitch length between the first middle lateral grooves 11 and one pitch length between the second middle lateral grooves 12 in the tire circumferential direction are the same one pitch length P1. A distance L1 in the tire circumferential direction between the inner end of the first middle lateral groove 11 on the circumferential sipe 10 side and the inner end of the second middle lateral groove 12 on the circumferential sipe 10 side is preferably not greater than 10% of the one pitch length P1. Thus, the first middle lateral grooves 11 and the second middle lateral grooves 12 can allow effective reduction of stiffness of the middle land portion 8, enhancement of ride comfort, and reduction of striking sound in the case of the middle land portion 8 coming into contact with the ground.

A length L2 of the first middle lateral groove 11 in the tire axial direction and a length L3 of the second middle lateral groove 12 in the tire axial direction are, for example, 25% to 45% of the width (that is, the width W4 of the outer middle land portion 8A or the width W5 of the inner middle land portion 8B), in the tire axial direction, of the land portion in which the grooves are disposed.

Each of the length L2 of the first middle lateral groove 11 and the length L3 of the second middle lateral groove 12 is preferably 7.0 to 12.0 mm and more preferably 8.0 to 10.0 mm. A distance L4 in the tire axial direction from the inner end of the first middle lateral groove 11 or the second middle lateral groove 12 on the circumferential sipe 10 side to the circumferential sipe 10 is, for example, 3.0 to 5.0 mm. The first middle lateral grooves 11 and the second middle lateral grooves 12 having such a structure can contribute to well-balanced enhancement of steering stability and ride comfort.

From the same standpoint, each of a groove width W8 of the first middle lateral groove 11 and a groove width W9 of the second middle lateral groove 12 is, for example, not greater than 3.5 mm, and preferably 1.8 to 2.2 mm.

In the present embodiment, a region obtained by extending the first middle lateral groove 11A in the outer middle land portion 8A along the length direction toward the inner tread end Ti preferably overlaps the end portion of the first middle lateral groove 11B in the inner middle land portion 8B on the crown circumferential groove 6 side. Thus, the land portions can integrally exert cornering force to enhance steering linearity.

From the same standpoint, a distance L7 in the tire circumferential direction between the end of the first middle lateral groove 11A in the outer middle land portion 8A and the end of the first middle lateral groove 11B in the inner middle land portion 8B is preferably not greater than 20% of the one pitch length P1.

The inner middle land portion 8B includes a plurality of inner middle sipes 18. The inner middle sipe 18 extends from the inner shoulder circumferential groove 5B and terminates in the inner middle land portion 8B without connecting with the circumferential sipe 10. The inner middle sipes 18 can allow reduction of stiffness of the inner middle land portion 8B and enhancement of ride comfort and noise performance.

A length L5 of the inner middle sipe 18 in the tire axial direction is, for example, ¥ 25% to 45% of the width W5 of the inner middle land portion 8B in the tire axial direction. The length L5 of the inner middle sipe 18 is, for example, 7.0 to 12.0 mm and preferably 8.0 to 10.0 mm.

A width of the inner middle sipe 18 is, for example, 0.5 to 1.5 mm and preferably 0.5 to 0.7 mm. An angle of the inner middle sipe 18 relative to the tire axial direction is, for example, 0.9 to 1.5°.

In the present embodiment, the inner middle sipe 18 and the second middle lateral groove 12 alternate in the tire circumferential direction. A distance L6 in the tire circumferential direction between the inner middle sipe 18 and the second middle lateral groove 12 is, for example, 35% to 50% of one pitch length P2 between the second middle lateral grooves 12 in the tire circumferential direction. The inner middle sipes 18 arranged in such a manner can allow the above-described effects to be exhibited while reducing uneven wear in the inner middle land portion 8B.

In the present embodiment, the outer middle land portion 8A does not include grooves and sipes other than the circumferential sipe 10, the first middle lateral grooves 11, and the second middle lateral grooves 12 described above. In the present embodiment, the inner middle land portion 8B does not include grooves and sipes other than the circumferential sipe 10, the first middle lateral grooves 11, the second middle lateral grooves 12, and the inner middle sipes 18 described above.

As shown in FIG. 3, the shoulder lateral groove 15 is, for example, inclined relative to the tire axial direction. In the present embodiment, the shoulder lateral groove 15 is inclined relative to the tire axial direction in the direction opposite to that of the first middle lateral groove 11 (shown in FIG. 2). An angle θ3 of the shoulder lateral groove 15 relative to the tire axial direction is, for example, 5 to 40°. The shoulder lateral groove 15 having such a structure can have an edge that allows frictional force to be exerted in a direction different from that of the first middle lateral groove 11, and can contribute to enhancement of steering stability.

A groove width W12 of the shoulder lateral groove 15 is, for example, 2.0 to 8.0 mm. A length L8 of the shoulder lateral groove 15 in the tire axial direction is, for example, 50% to 80% of the width (that is, the width W3 of the outer shoulder land portion 7A or the width W6 of the inner shoulder land portion 7B), in the tire axial direction, of the land portion in which the shoulder lateral groove 15 is disposed.

A distance L9 in the tire axial direction from the inner end of the shoulder lateral groove 15 to the shoulder circumferential groove 5 is, for example, 5 to 25 mm and preferably 12 to 20 mm. The distance L9 is preferably greater than the distance in the tire axial direction between the first middle lateral groove 11 and the second middle lateral groove 12 (shown FIG. 2). Thus, stiffness of the shoulder land portion 7 can be sufficiently assured.

The length of the shoulder lateral groove 15B in the inner shoulder land portion 7B in the tire axial direction can be preferably less than the length of the shoulder lateral groove 15A in the outer shoulder land portion 7A in the tire axial direction. Thus, stiffness can be assured near the inner tread end Ti and steering stability can be further enhanced.

The shoulder land portion 7 includes, for example, a plurality of shoulder sipes 25. The shoulder sipes 25 are inclined relative to the tire axial direction. The shoulder sipe 25 is, for example, inclined in the same direction as the shoulder lateral groove 15 adjacent thereto. An angle of the shoulder sipe 25 relative to the tire axial direction is, for example, 5 to 40°. The shoulder sipe 25 extends across the shoulder land portion 7. In the present embodiment, the shoulder sipe 25 and the shoulder lateral groove 15 alternate in the tire circumferential direction. A width of the shoulder sipe 25 is, for example, 0.6 to 1.2 mm.

As shown in FIG. 1, a distance in the tire circumferential direction between the end of the shoulder sipe 25A in the outer shoulder land portion 7A on the shoulder circumferential groove 5 side and the end of the second middle lateral groove 12A on the shoulder circumferential groove 5 side is preferably not greater than 10% of one pitch length between the second middle lateral grooves 12 in the tire circumferential direction. Thus, the land portions can integrally exert cornering force to enhance steering linearity.

From the same standpoint, a distance in the tire circumferential direction between the end of the shoulder sipe 25B in the inner shoulder land portion 7B on the shoulder circumferential groove 5 side and the end of the inner middle sipe 18 on the shoulder circumferential groove 5 side is preferably not greater than 10% of one pitch length between the inner middle sipes 18 in the tire circumferential direction.

The shoulder land portion 7 does not include grooves and sipes other than the shoulder lateral grooves 15 and the shoulder sipes 25 described above.

In the present embodiment, the land portions include the above-described grooves and sipes. Therefore, stiffness of the outer shoulder land portion 7A in the tire circumferential direction can be higher than stiffness of the inner shoulder land portion 7B in the tire circumferential direction. Stiffness of the inner shoulder land portion 7B in the tire circumferential direction can be higher than stiffness of the outer middle land portion 8A in the tire circumferential direction. Stiffness of the outer middle land portion 8A in the tire circumferential direction can be higher than stiffness of the inner middle land portion 8B in the tire circumferential direction. The tire 1 having such a stiffness distribution can exert high cornering force, and can allow steering linearity to be enhanced.

Figure 4:
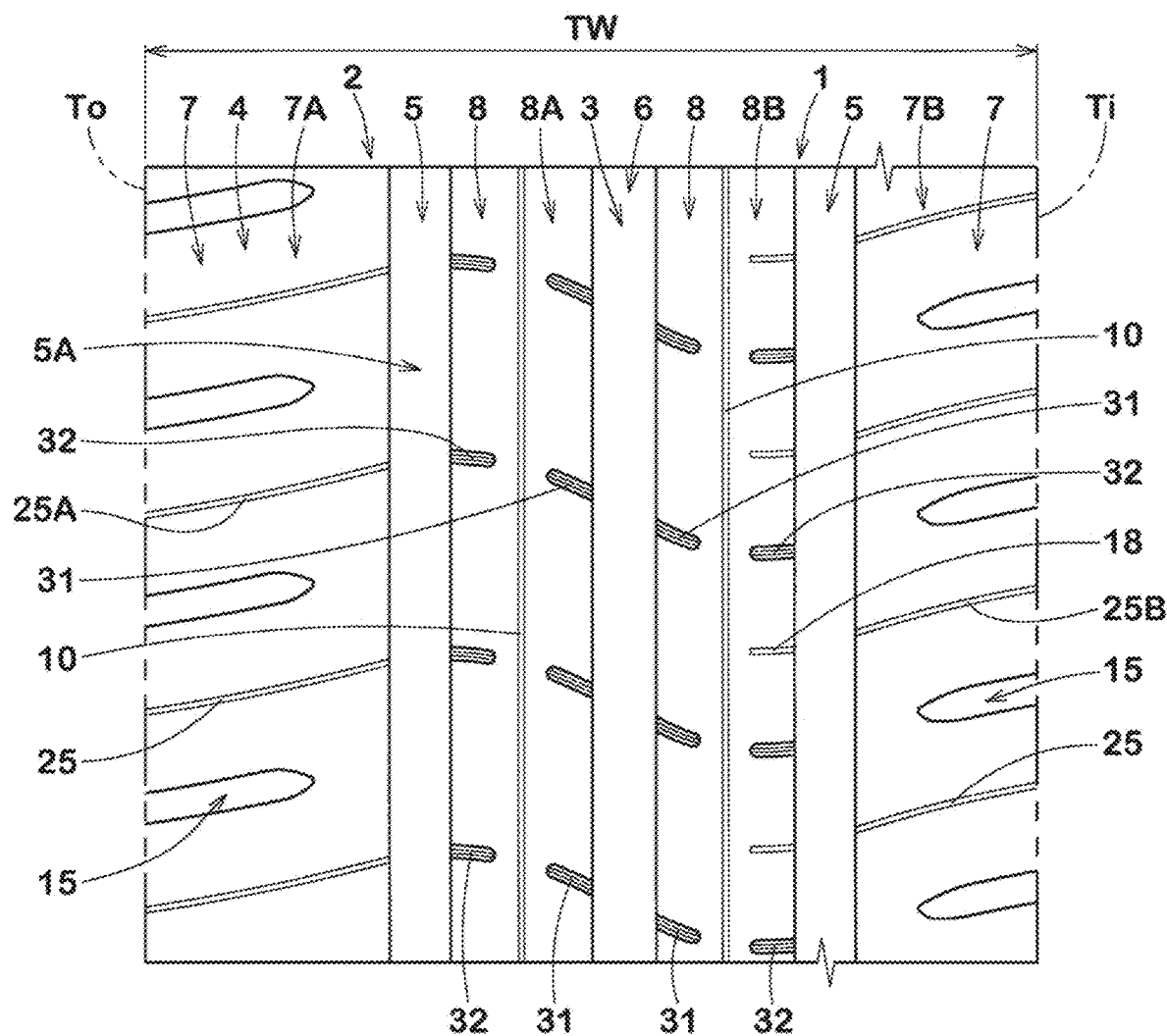
FIG. 4 is a development of a tread portion of a tire according to another embodiment of the present disclosure.
Figure 5:
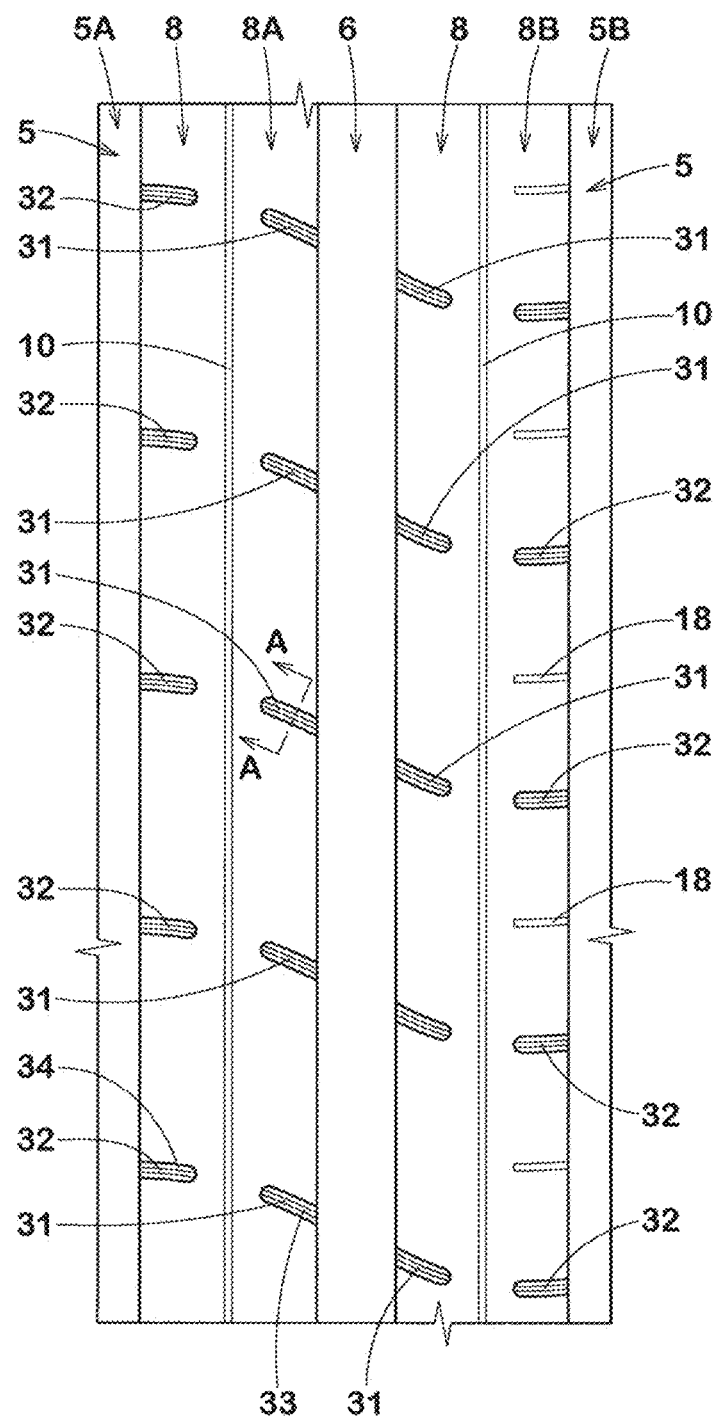
FIG. 5 is an enlarged view of a portion of FIG. 4.

FIG. 4 is a development of a tread portion 2 of a tire 1 according to another embodiment of the present disclosure. FIG. 5 is an enlarged view of the outer middle land portion 8A and the inner middle land portion 8B shown in FIG. 4. The structure in the embodiment shown in FIG. 1 to FIG. 3 can be applied to the structure which is not described in the present embodiment.

As shown in FIG. 4 and FIG. 5, in the present embodiment, the two middle land portions 8 (the outer middle land portion 8A and the inner middle land portion 8B) each include a plurality of first middle sipes 31 extending from the crown circumferential groove 6 and terminating in the middle land portion 8 without connecting with the circumferential sipe 10, and a plurality of second middle sipes 32 extending from the shoulder circumferential groove 5 and terminating in the middle land portion 8 without connecting with the circumferential sipe 10. The first middle sipes 31 and the second middle sipes 32 having such structures can allow stiffness of the middle land portion 8 to be maintained and allow steering stability to be further enhanced. The above-described structure of the first middle lateral groove 11 can be applied to the structure (for example, the length, the angle, and the pitch) of the first middle sipe 31 in a planar view of the tread. Similarly, the above-described structure of the second middle lateral groove 12 can be applied to the structure of the second middle sipe 32 in a planar view of the tread.

Figure 6:
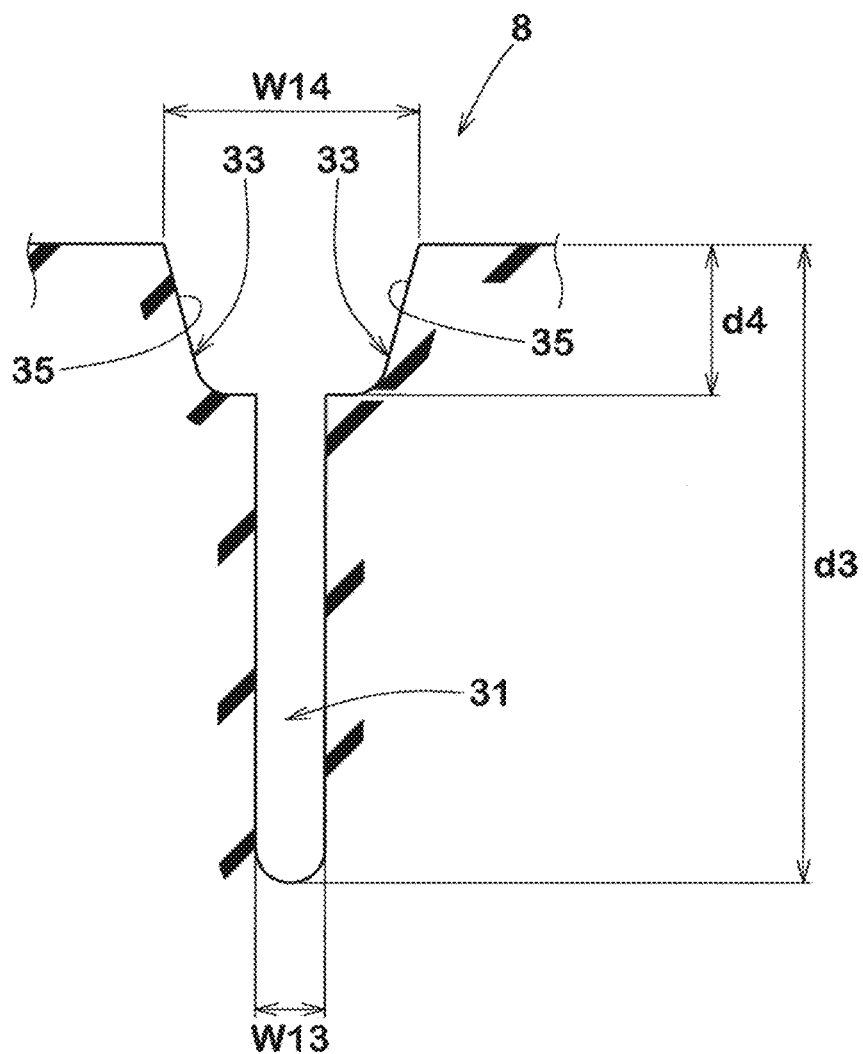
FIG. 6 is an enlarged cross-sectional view taken along a line A-A in FIG. 5.

FIG. 6 is an enlarged cross-sectional view taken along a line A-A in FIG. 5. As shown in FIG. 6, a first chamfered portion 33 is disposed, on the outer side of the first middle sipe 31 in the tire radial direction, so as to be opened at the ground contact surface of the middle land portion 8. The first chamfered portion 33 is opened with the width greater than the width of the first middle sipe 31. The first chamfered portions 33 can be disposed on sipe edges on both sides of the first middle sipe 31 in the tire circumferential direction. The first chamfered portion 33 having such a structure can allow reduction of strain of the ground contact surface of the middle land portion 8 and reduction of uneven wear. However, the present disclosure is not limited thereto, and, for example, the first middle sipe 31 may extend with a constant width from the bottom portion of the first middle sipe 31 to the ground contact surface of the middle land portion 8.

An opening width W14 of the first chamfered portion 33 is, for example, 3.0 to 4.5 times a width W13 of the first middle sipe 31. A depth d4 of the first chamfered portion 33 is, for example, not greater than 30% of the entire depth d3 from the ground contact surface of the middle land portion 8 to the bottom of the first middle sipe 31, and is preferably 15% to 25% thereof.

The first chamfered portion 33 includes, for example, an inclined surface 35 connecting with the ground contact surface of the middle land portion 8. For example, the inclined surface 35 is inclined, at an angle of 10 to 45°, relative to the normal line that passes through the opening edge of the first chamfered portion 33 and is orthogonal to the ground contact surface of the middle land portion 8.

Similarly, as shown in FIG. 5, a second chamfered portion 34 is disposed, on the outer side of the second middle sipe 32 in the tire radial direction, so as to be opened at the ground contact surface of the middle land portion 8. The second chamfered portions 34 can be disposed on sipe edges on both sides of the second middle sipe 32 in the tire circumferential direction. The above-described structure of the first chamfered portion 33 shown in FIG. 6 can be applied to the second chamfered portion 34.

Figure 7:
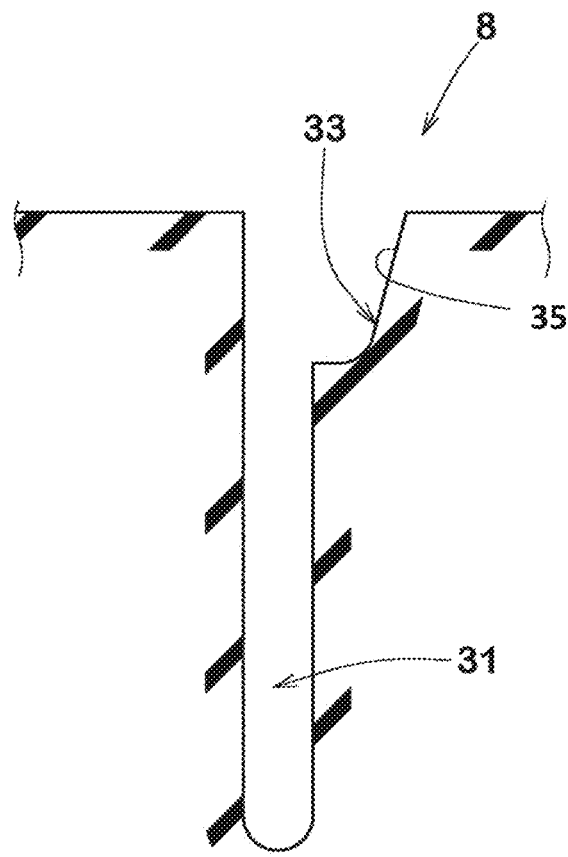
FIG. 7 is an enlarged cross-sectional view of a first middle sipe and a first chamfered portion according to an embodiment of the present disclosure.

FIG. 7 shows a first chamfered portion 33 according to another embodiment. As shown in FIG. 7, the first chamfered portion 33 may be, for example, disposed on a sipe edge on one side of the first middle sipe 31 in the tire circumferential direction. The first chamfered portion 33 having such a structure allows reduction of strain of the ground contact surface while maintaining stiffness of the middle land portion 8. The embodiment shown in FIG. 7 can be also applied to the second middle sipe 32 and the second chamfered portion 34.

Although the tires according to the embodiments of the present disclosure have been described above in detail, the present disclosure is not limited to the above-described specific embodiments, and various modifications can be made to implement the present disclosure.

EXAMPLES

Figure 8:
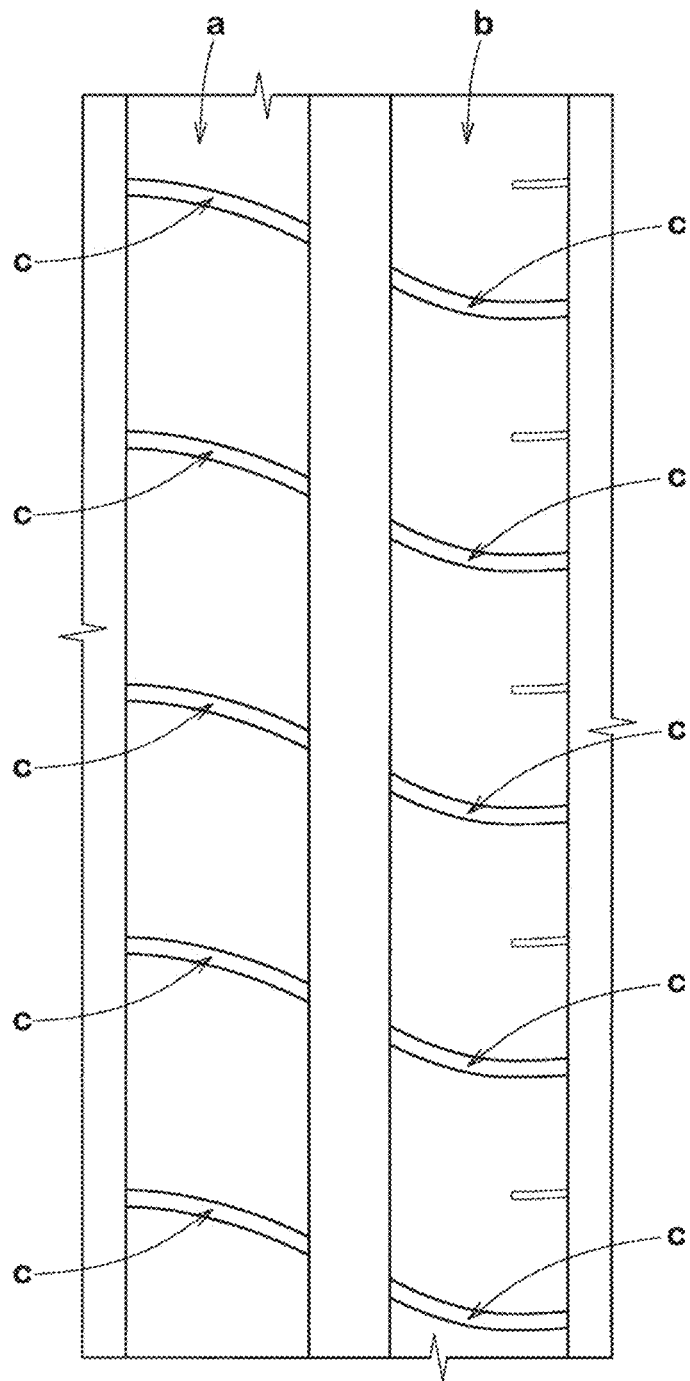
FIG. 8 is an enlarged view showing an outer middle land portion and an inner middle land portion of a tire according to comparative example.

Sample tires each having a basic tread pattern shown in FIG. 1 and the size of 205/55R16 were produced according the specifications indicated in Tables 1 and 2. A sample tire having an outer middle land portion a and an inner middle land portion b shown in FIG. 8 was produced as a comparative example. Each of the outer middle land portion a and the inner middle land portion b in the comparative example had a plurality of lateral grooves c extending across the land portion, and had no circumferential sipe extending continuously in the tire circumferential direction. The tire of the comparative example had substantially the same pattern as shown in FIG. 1 except for the above-described structures. Each test tire was tested for steering stability, ride comfort, and noise performance. Specifications common to the test tires and a test method are as follows.

Rim: 16×6.5JJ
Tire internal pressure: 220 kPa
Test vehicle: front-wheel-drive car having an engine displacement of 1500 cc
Positions at which the tires were mounted: All wheels <Steering Stability>
Sensory evaluation was made by a driver for steering stability when the driver drove the above-described test vehicle on a dry road surface. The results are indicated as scores with the score of the comparative example being 100. The greater the value is, the better steering stability is.

<Ride Comfort>
Sensory evaluation was made by a driver for ride comfort when the driver drove the above-described test vehicle on a dry road surface. The results are indicated as scores with the score of the comparative example being 1. The greater the value is, the better ride comfort is.

<Noise Performance>
The above-described test vehicle was driven to run on a dry road surface at 40 to 100 km/h, and the highest sound pressure of noise in the vehicle was measured in this case. The results are indicated as indexes with the sound pressure of the comparative example being 100. The less the value is, the less the noise is in the running and the better the noise performance is.

The test results are indicated in Tables 1 and 2.

TABLE 1

| | Comp. Ex. | Ex. 1 | Ex. 2 | Ex. 3 | Ex. 4 | Ex. 5 | Ex. 6 | Ex. 7 |
|---|---|---|---|---|---|---|---|---|
| Figure showing middle land portion | FIG. 8 | FIG. 2 | FIG. 2 | FIG. 2 | FIG. 2 | FIG. 2. | FIG. 2 | FIG. 2 |
| Width W3 of outer shoulder land portion/ width W5 of inner middle land portion (%) | 143 | 143 | 140 | 142 | 144 | 146 | 143 | 143 |
| Width W6 of inner shoulder land portion/ width W5 of inner middle land portion (%) | 123 | 123 | 123 | 123 | 123 | 123 | 120 | 122 |
| Width W4 of outer | 102 | 102 | 102 | 102 | 102 | 102 | 102 | 102 |

TABLE 1-continued

|  | Comp. Ex. | Ex. 1 | Ex. 2 | Ex. 3 | Ex. 4 | Ex. 5 | Ex. 6 | Ex. 7 |
|---|---|---|---|---|---|---|---|---|
| middle land portion/ width W5 of inner middle land portion (%) |  |  |  |  |  |  |  |  |
| Steering stability (score) | 100 | 107 | 105 | 107 | 107 | 108 | 104 | 106 |
| Ride comfort (score) | 100 | 100 | 101 | 100 | 100 | 98 | 101 | 101 |
| Noise performance (index) | 100 | 99 | 99 | 99 | 99 | 100 | 98 | 99 |

TABLE 2

|  | Ex. 8 | Ex. 9 | Ex. 10 | Ex. 11 | Ex. 12 | Ex. 13 |
|---|---|---|---|---|---|---|
| Figure showing middle land portion | FIG. 2 | FIG. 2 | FIG. 2 | FIG. 2 | FIG. 2 | FIG. 2 |
| Width W3 of outer shoulder land portion/ width W5 of inner middle land portion (%) | 143 | 143 | 143 | 143 | 143 | 143 |
| Width W6 of inner shoulder land portion/ width W5 of inner middle land portion (%) | 124 | 126 | 123 | 123 | 123 | 123 |
| Width W4 of outer middle land portion/ width W5 of inner middle land portion (%) | 102 | 102 | 100 | 101 | 103 | 105 |
| Steering stability (score) | 107 | 107 | 104 | 106 | 107 | 107 |
| Ride comfort (score) | 100 | 99 | 101 | 100 | 100 | 100 |
| Noise performance (index) | 99 | 100 | 99 | 99 | 99 | 100 |

According to the test results, it was confirmed that the tires of the examples exhibited excellent steering stability while maintaining ride comfort. It was also confirmed that the tires of the examples exhibited excellent noise performance.

Sample tires having the middle land portions shown in FIG. 5 were produced according to the specifications in Table 3, and the same tests as described above were made. The test results are indicated in Table 3.

TABLE 3

|  | Ex. 14 | Ex. 15 | Ex. 16 | Ex. 17 | Ex. 18 | Ex. 19 | Ex. 20 |
|---|---|---|---|---|---|---|---|
| Figure showing middle land portion | FIG. 5 | FIG. 5 | FIG. 5 | FIG. 5 | FIG. 5 | FIG. 5 | FIG. 5 |
| Width W3 of outer shoulder land portion/ width W5 of inner middle land portion (%) | 143 | 140 | 142 | 144 | 146 | 143 | 143 |
| Width W6 of inner shoulder land portion/ width W5 of inner middle land portion (%) | 123 | 123 | 123 | 123 | 123 | 120 | 122 |
| Width W4 of outer middle land portion/ width W5 of inner middle land portion (%) | 102 | 102 | 102 | 102 | 102 | 102 | 102 |
| Steering stability (score) | 108 | 106 | 107 | 108 | 108 | 105 | 107 |
| Ride comfort (score) | 100 | 100 | 100 | 100 | 97 | 100 | 100 |
| Noise performance (index) | 98 | 98 | 99 | 98 | 99 | 98 | 98 |

According to the test results, it was confirmed that the tires of the examples indicated in Table 3 also exhibited excellent steering stability while maintaining ride comfort. It was also confirmed that the tires of the examples exhibited excellent noise performance.

In view of the above, aspects of the embodiments include a variety of features, such as those described below.

In the tire according to the present disclosure, the tread portion preferably has a designated mounting direction to a vehicle. The two tread ends preferably include an outer tread end located on an outer side of a vehicle when the tire is mounted to the vehicle, and an inner tread end located on an inner side of the vehicle when the tire is mounted to the vehicle. The two shoulder land portions preferably include an outer shoulder land portion including the outer tread end and an inner shoulder land portion including the inner tread end. The two middle land portions preferably include an outer middle land portion adjacent to the outer shoulder land portion and an inner middle land portion adjacent to the inner shoulder land portion.

In the tire according to the present disclosure, a width of the outer shoulder land portion in a tire axial direction is preferably greater than a width of the inner shoulder land portion in the tire axial direction.

In the tire according to the present disclosure, a width of the inner shoulder land portion in a tire axial direction is preferably greater than a width of the outer middle land portion in the tire axial direction.

In the tire according to the present disclosure, a width of the outer middle land portion in a tire axial direction is preferably greater than a width of the inner middle land portion in the tire axial direction.

In the tire according to the present disclosure, a stiffness of the outer shoulder land portion in the tire circumferential direction is preferably higher than a stiffness of the inner shoulder land portion in the tire circumferential direction.

In the tire according to the present disclosure, the outer shoulder land portion preferably includes a plurality of shoulder sipes extending across the outer shoulder land portion. A distance in the tire circumferential direction between an end of each of the shoulder sipes on the shoulder circumferential groove side and an end of a corresponding one of the second middle lateral grooves in the outer middle land portion on the shoulder circumferential groove side is preferably not greater than 10% of one pitch length between the second middle lateral grooves in the tire circumferential direction.

In the tire according to the present disclosure, the inner middle land portion preferably includes a plurality of inner middle sipes extending from a corresponding one of the shoulder circumferential grooves and terminating in the inner middle land portion.

In the tire according to the present disclosure, the inner shoulder land portion preferably includes a plurality of shoulder sipes extending across the inner shoulder land portion. A distance in the tire circumferential direction between an end of each of the shoulder sipes in the inner shoulder land portion on the shoulder circumferential groove side and an end of a corresponding one of the inner middle sipes on the shoulder circumferential groove side is preferably not greater than 10% of one pitch length between the inner middle sipes in the tire circumferential direction.

In the tire according to the present disclosure, a groove width of each of the shoulder circumferential grooves is preferably less than a groove width of the crown circumferential groove.

In the tire according to the present disclosure, an angle of each of the first middle lateral grooves relative to a tire axial direction and an angle of each of the second middle lateral grooves relative to the tire axial direction are preferably different from each other in each of the two middle land portions.

In the tire according to the present disclosure, each of the two shoulder land portions preferably includes a plurality of shoulder sipes extending across a corresponding one of the shoulder land portions. The shoulder lateral grooves and the shoulder sipes are preferably inclined relative to a tire axial direction.

A tire according to a second aspect of the present disclosure is directed to a tire including a tread portion. The tread portion includes three circumferential grooves extending between two tread ends continuously in a tire circumferential direction, and four land portions demarcated by the circumferential grooves. The circumferential grooves include two shoulder circumferential grooves and one crown circumferential groove disposed between the two shoulder circumferential grooves. The land portions include two shoulder land portions including the tread ends, and two middle land portions demarcated between the shoulder circumferential grooves and the crown circumferential groove. Each of the two middle land portions includes: a circumferential sipe extending continuously in the tire circumferential direction: a plurality of first middle sipes extending from the crown circumferential groove and terminating in a corresponding one of the middle land portions without connecting with the circumferential sipe; and a plurality of second middle sipes extending from a corresponding one of the shoulder circumferential grooves and terminating in a corresponding one of the middle land portions without connecting with the circumferential sipe. Each of the two shoulder land portions includes a plurality of shoulder lateral grooves extending from a corresponding one of the tread ends and terminating in a corresponding one of the shoulder land portions.

In the tire according to the present disclosure, a first chamfered portion is preferably disposed on an outer side of each of the first middle sipes in a tire radial direction so as to be opened at a ground contact surface of a corresponding one of the middle land portions.

In the tire according to the present disclosure, the first chamfered portion is preferably disposed on each of sipe edges on both sides of each of the first middle sipes in the tire circumferential direction.

In the tire according to the present disclosure, a second chamfered portion is preferably disposed on an outer side of each of the second middle sipes in a tire radial direction so as to be opened at a ground contact surface of a corresponding one of the middle land portions.

In the tire according to the present disclosure, the second chamfered portion is preferably disposed on each of sipe edges on both sides of each of the second middle sipes in the tire circumferential direction.

In the tire according to the present disclosure, the tread portion preferably has a designated mounting direction to a vehicle. The two tread ends preferably include an outer tread end located on an outer side of a vehicle when the tire is mounted to the vehicle, and an inner tread end located on an inner side of the vehicle when the tire is mounted to the vehicle. The two shoulder land portions preferably include an outer shoulder land portion including the outer tread end and an inner shoulder land portion including the inner tread end. The two middle land portions preferably include an outer middle land portion adjacent to the outer shoulder land portion and an inner middle land portion adjacent to the inner shoulder land portion. A width of the outer shoulder land portion in a tire axial direction is preferably greater than a width of the inner shoulder land portion in the tire axial direction. A width of the inner shoulder land portion in the tire axial direction is preferably greater than a width of the outer middle land portion in the tire axial direction. A width of the outer middle land portion in the tire axial direction is preferably greater than a width of the inner middle land portion in the tire axial direction.

In the tire according to the present disclosure, the tread portion preferably has a designated mounting direction to a vehicle. The two tread ends preferably include an outer tread end located on an outer side of a vehicle when the tire is mounted to the vehicle, and an inner tread end located on an inner side of the vehicle when the tire is mounted to the vehicle. The two shoulder land portions preferably include an outer shoulder land portion including the outer tread end and an inner shoulder land portion including the inner tread end. The two middle land portions preferably include an outer middle land portion adjacent to the outer shoulder land portion and an inner middle land portion adjacent to the inner shoulder land portion. A width of the outer shoulder land portion in a tire axial direction is preferably greater than a width of the inner shoulder land portion in the tire axial direction. The outer shoulder land portion preferably includes a plurality of shoulder sipes extending across the outer shoulder land portion. A distance in the tire circumferential direction between an end of each of the shoulder sipes on the shoulder circumferential groove side and an end of a corresponding one of the second middle sipes in the outer middle land portion on the shoulder circumferential groove side is preferably not greater than 10% of one pitch length between the second middle sipes in the tire circumferential direction.

In the tire according to the present disclosure, the inner middle land portion preferably includes a plurality of inner middle sipes extending from a corresponding one of the shoulder circumferential grooves and terminating in the inner middle land portion. The inner shoulder land portion preferably includes a plurality of shoulder sipes extending across the inner shoulder land portion. A distance in the tire circumferential direction between an end of each of the shoulder sipes in the inner shoulder land portion on the shoulder circumferential groove side and an end of a corresponding one of the inner middle sipes on the shoulder circumferential groove side is preferably not greater than 10% of one pitch length between the inner middle sipes in the tire circumferential direction.

In the tire according to the present disclosure, the tread portion includes the three circumferential grooves and the four land portions demarcated by the circumferential grooves. The land portions include the two shoulder land portions including the tread ends, and the two middle land portions demarcated between the shoulder circumferential grooves and the crown circumferential groove.

Each of the two middle land portions includes the circumferential sipe extending continuously in the tire circumferential direction, a plurality of first middle lateral grooves extending from the crown circumferential groove and terminating in the middle land portion without connecting with the circumferential sipe, and a plurality of second middle lateral grooves extending from the shoulder circumferential groove and terminating in the middle land portion without connecting with the circumferential sipe.

The circumferential sipe allows appropriate reduction of stiffness in the tire axial direction and enhancement of ride comfort while maintaining stiffness of the middle land portion in the tire circumferential direction. Furthermore, the first middle lateral grooves and the second middle lateral grooves terminate in the middle land portion without connecting with the circumferential sipe, and, therefore, ride comfort is enhanced while stiffness of the middle land portion in the tire circumferential direction is maintained.

Meanwhile, the two middle land portions in which stiffness in the tire circumferential direction is maintained also contribute to enhancement of steering stability.

Furthermore, each of the two shoulder land portions of the present disclosure includes a plurality of shoulder lateral grooves extending from the tread end and terminating in the shoulder land portion. Therefore, excellent steering stability can be exhibited while ride comfort is maintained.

What is claimed is:
1. A tire comprising:
a tread portion, wherein the tread portion comprises:
three circumferential grooves extending between two tread ends continuously in a tire circumferential direction, and
four land portions demarcated by the circumferential grooves,
wherein the circumferential grooves include two shoulder circumferential grooves and one crown circumferential groove between the two shoulder circumferential grooves,
wherein the land portions comprise two shoulder land portions that respectively include the tread ends, and two middle land portions demarcated between the shoulder circumferential grooves and the crown circumferential groove,
wherein the tread portion has a designated mounting direction to a vehicle, wherein the two tread ends comprise an outer tread end to be located on an outer side of the vehicle when the tire is mounted to the vehicle, and an inner tread end to be located on an inner side of the vehicle when the tire is mounted to the vehicle,
wherein each of the two middle land portions comprises:
a circumferential sipe extending continuously in the tire circumferential direction,
a plurality of first middle sipes extending from the crown circumferential groove and terminating in a corresponding one of the middle land portions without connecting with the circumferential sipe, and
a plurality of second middle sipes extending from a corresponding one of the shoulder circumferential grooves and terminating in the corresponding one of the middle land portions without connecting with the circumferential sipe,
wherein each of the two shoulder land portions comprises a plurality of shoulder lateral grooves extending from a corresponding one of the tread ends and terminating in a corresponding one of the shoulder land portions,
wherein an inner middle land portion of the two middle land portions includes a plurality of inner middle sipes extending from an inner shoulder circumferential groove of the shoulder circumferential grooves and terminating in the inner middle land portion,
wherein the inner middle sipes alternate with the second middle sipes of the inner middle land portion in the tire circumferential direction,
wherein the second middle sipes of the inner middle land portion are chamfered on opposite sides in the tire circumferential direction, and
wherein the inner middle sipes are free of any chamfers.

2. The tire according to claim 1, wherein a first chamfered portion is on an outer side of each of the first middle sipes in a tire radial direction so as to be opened at a ground contact surface of the corresponding one of the middle land portions.

3. The tire according to claim 2, wherein the first chamfered portion is on each of sipe edges on both sides of each of the first middle sipes in the tire circumferential direction.

4. The tire according to claim 1, wherein a second chamfered portion is on an outer side of each of the second middle sipes in a tire radial direction so as to be opened at a ground contact surface of the corresponding one of the middle land portions.

5. The tire according to claim 4, wherein the second chamfered portion is on each of sipe edges on the opposite sides of each of the second middle sipes in the tire circumferential direction such that the second chamfered portion extends an entire length of each of the second middle sipes.

6. The tire according to claim 1,
wherein the two shoulder land portions comprise an outer shoulder land portion including the outer tread end and an inner shoulder land portion including the inner tread end,
wherein the two middle land portions comprise an outer middle land portion associated with the outer shoulder land portion and an inner middle land portion associated with the inner shoulder land portion,
wherein a width of the outer shoulder land portion in a tire axial direction is greater than a width of the inner shoulder land portion in the tire axial direction,
wherein a width of the inner shoulder land portion in the tire axial direction is greater than a width of the outer middle land portion in the tire axial direction, and
wherein a width of the outer middle land portion in the tire axial direction is greater than a width of the inner middle land portion in the tire axial direction.

7. The tire according to claim 1,
wherein the two shoulder land portions comprise an outer shoulder land portion including the outer tread end and an inner shoulder land portion including the inner tread end,
wherein the two middle land portions comprise an outer middle land portion associated with the outer shoulder land portion and an inner middle land portion associated with the inner shoulder land portion,
wherein a width of the outer shoulder land portion in a tire axial direction is greater than a width of the inner shoulder land portion in the tire axial direction,
wherein the outer shoulder land portion comprises a plurality of shoulder sipes extending across the outer shoulder land portion, and
wherein a distance in the tire circumferential direction between an end of each of the shoulder sipes on a shoulder circumferential groove side and an end of a corresponding one of the second middle sipes in the outer middle land portion on the shoulder circumferential groove side is not greater than 10% of one pitch length between the second middle sipes in the tire circumferential direction.

8. The tire according to claim 7,
wherein the inner shoulder land portion comprises a plurality of shoulder sipes extending across the inner shoulder land portion, and
wherein a distance in the tire circumferential direction between an end of each of the shoulder sipes in the inner shoulder land portion on the shoulder circumferential groove side and an end of a corresponding one of the inner middle sipes on the shoulder circumferential groove side is not greater than 10% of one pitch length between the inner middle sipes in the tire circumferential direction.

9. The tire according to claim 1,
wherein a width of the second middle sipes of the inner middle land portion at a contact surface of the tire is 3.0 to 4.5 times a width at a bottom of the second middle sipes of the inner middle land portion opposite the contact surface,
wherein a depth of a chamfered portion of the second middle sipes of the inner middle land portion is 15% to 25% times a total depth of the second middle sipes of the inner middle land portion from the contact surface to the bottom of the second middle sipes of the inner middle land portion, and
wherein in a side sectional view of each the second middle sipes the chamfered portion is trapezoidal in shape.

10. The tire according to claim 1, wherein in a side sectional view of each the second middle sipes the chamfered portion is trapezoidal in shape.

11. The tire according to claim 1,
wherein, for each of the middle land portions, the first middle sipes and the second middle sipes are in pairs across the circumferential sipe, and
wherein the inner middle sipes are without any opposing first middle sipe across the circumferential sipe.

12. A tread portion of a tire comprising:
three circumferential grooves extending between two tread ends continuously in a tire circumferential direction, and
four land portions demarcated by the circumferential grooves,
wherein the circumferential grooves include two shoulder circumferential grooves and one crown circumferential groove between the two shoulder circumferential grooves,
wherein the land portions comprise two shoulder land portions that respectively include the tread ends, and two middle land portions demarcated between the shoulder circumferential grooves and the crown circumferential groove,
wherein the tread portion has a designated mounting direction to a vehicle, wherein the two tread ends comprise an outer tread end to be located on an outer side of the vehicle when the tire is mounted to the vehicle, and an inner tread end to be located on an inner side of the vehicle when the tire is mounted to the vehicle,
wherein each of the two middle land portions comprises:
a circumferential sipe extending continuously in the tire circumferential direction,
a plurality of first middle sipes extending from the crown circumferential groove and terminating in a corresponding one of the middle land portions without connecting with the circumferential sipe, and
a plurality of second middle sipes extending from a corresponding one of the shoulder circumferential grooves and terminating in the corresponding one of the middle land portions without connecting with the circumferential sipe,
wherein each of the two shoulder land portions comprises a plurality of shoulder lateral grooves extending from a corresponding one of the tread ends and terminating in a corresponding one of the shoulder land portions,
wherein an inner middle land portion of the two middle land portions includes a plurality of inner middle sipes extending from an inner shoulder circumferential groove of the shoulder circumferential grooves and terminating in the inner middle land portion,
wherein the inner middle sipes alternate with the second middle sipes of the inner middle land portion in the tire circumferential direction,
wherein the second middle sipes of the inner middle land portion have chamfered portions on opposite sides in the tire circumferential direction, each of the chamfered portions extending an entire length of the second middle sipes of the inner middle land portion, wherein the inner middle sipes are free of any chamfers, wherein, for each of the middle land portions, the first middle sipes and the second middle sipes are in pairs across the circumferential sipe, and wherein the inner middle sipes are without any opposing first middle sipe across the circumferential sipe.

\* \* \* \* \*